Aug. 23, 1927.　　　　　　　　　　　　　　　　　1,639,973
C. E. VAN ORSTRAND
APPARATUS FOR MEASURING DEPTHS OF WELLS
Filed June 8, 1926　　　　2 Sheets-Sheet 1
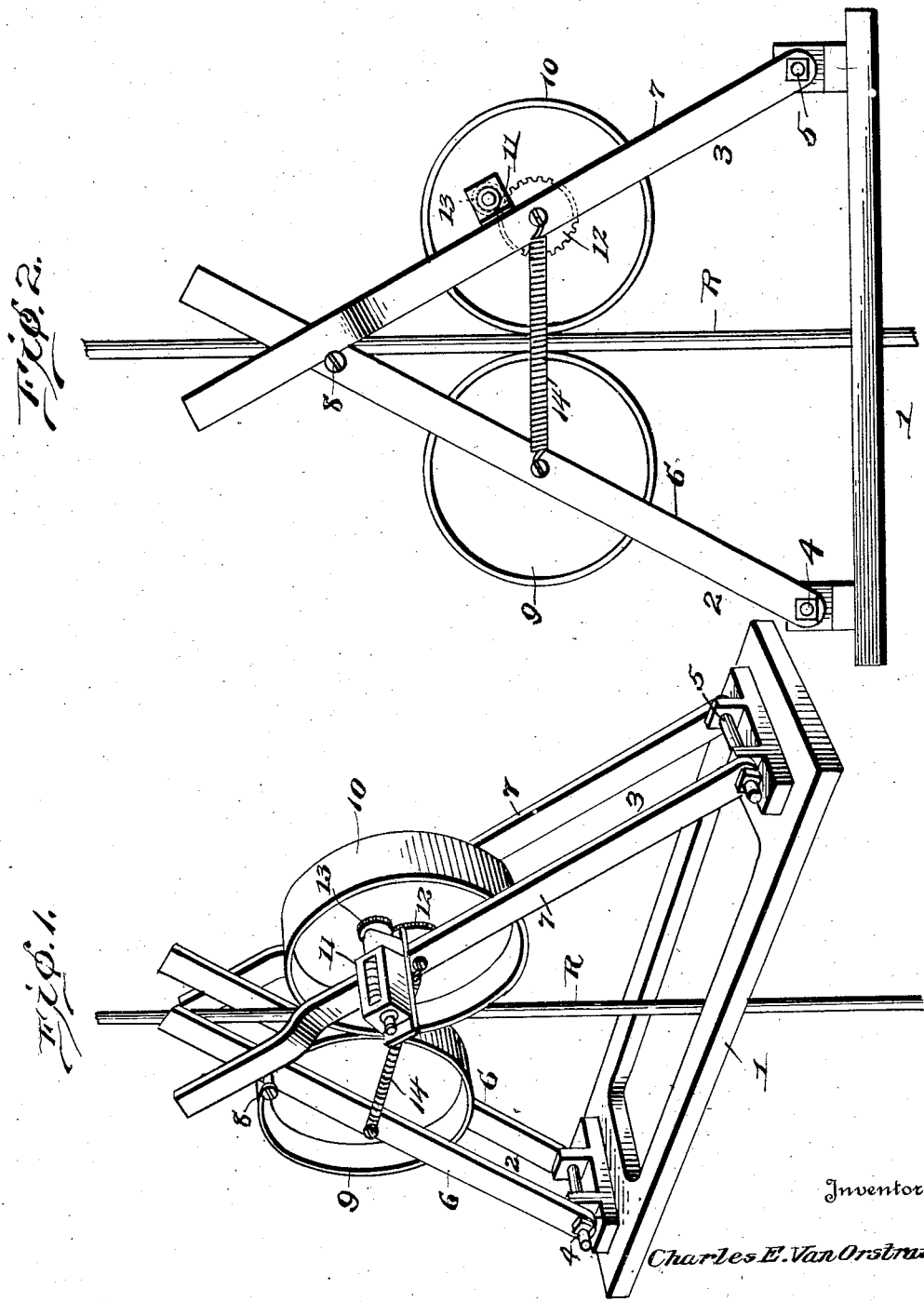
Inventor
Charles E. Van Orstrand
By Chas. Silver Attorney Aug. 23, 1927.
C. E. VAN ORSTRAND
1,639,973
APPARATUS FOR MEASURING DEPTHS OF WELLS
Filed June 8, 1926   2 Sheets-Sheet 2
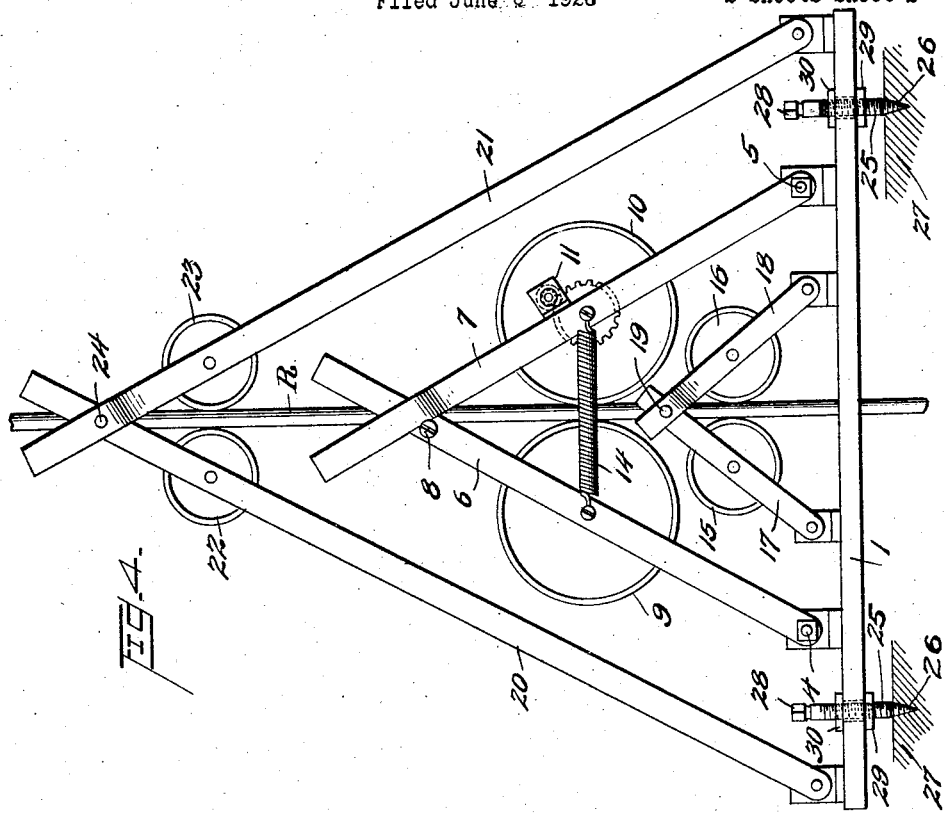
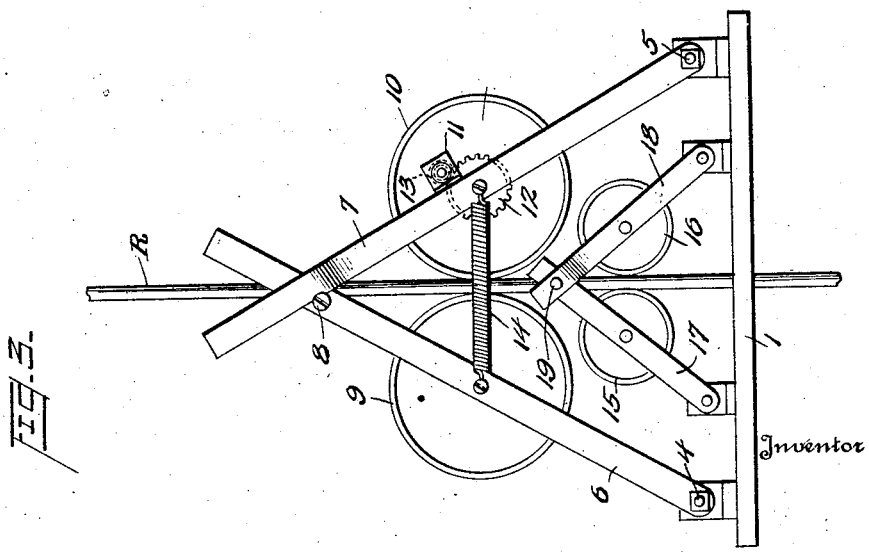
Inventor
Charles E. Van Orstrand,
By Chas. Silver Attorney Patented Aug. 23, 1927.

1,639,973

UNITED STATES PATENT OFFICE.

CHARLES E. VAN ORSTRAND, OF WASHINGTON, DISTRICT OF COLUMBIA.

APPARATUS FOR MEASURING DEPTHS OF WELLS.

Application filed June 8, 1926. Serial No. 114,594.

This invention relates to devices for measuring depths of wells, such as oil, gas, artesian and the like.

Among the objects of this invention is to provide an apparatus whereby measurements of high precision may be obtained and whereby accurate results may be obtained when the measuring is intrusted to unskilled labor. A further object of this invention is to provide a device whereby accurate measurements may be performed in a short space of time and requiring substantially a minimum of labor and attention on the part of the operator. A still further object of this invention is to provide means for obtaining accurate measurements when the cable is subject to vibrations as it is lowered into or raised from the well, the means being easily brought to the sand-line and so positioned as not to interfere with the well drilling operations.

Other further and more specific objects of the invention will become readily apparent to persons skilled in the art from a consideration of the following description when taken in conjunction with the drawings, wherein:

Fig. 1 is a perspective view showing my improved device in operation.

Fig. 2 is a side elevation of the device shown in Fig. 1.

Figs. 3 and 4 are side elevations of modified forms of my device.

The apparatus comprises a base (1) having the carriages (2) and (3) hinged thereto at (4) and (5), respectively. Each of these carriages is provided with bifurcated side members (6) and (7), the bifurcated members (7) being distended somewhat at their free ends to receive the free ends of the members (6) when the carriages are brought towards each other. The frame (2) is provided with a bolt or projection (8) acting as a stop for limiting the movement of the frames or carriages toward each other. Each of these frames or carriages (2) and (3) are provided with wheels (9) and (10) journalled in and between the respective pairs of bifurcated members (6) and (7), and I prefer to have the faces of these wheels wide and made of very hard material, such as case-hardened or hard alloy steel in order to present a durable wearing surface to the cable or sand-line (R). This is important because any wearing away of the recording wheel will reduce its diameter and thus introduce errors in measurement. Also, by having the face wide and flat, the contact with the cable is not always in the same place but permits slight side-wise motion of the cable and thus minimizes local wearing.

In the construction shown, the wheel (10) is provided with a registering mechanism (11) and constitutes the registering wheel. If desired, a similar registering device may be attached to the wheel (9), to serve as a check on the measurements by the wheel (10) or to be available for use should the registering means (11) become unserviceable for any reason.

The registering wheel (10) carries a gear (12) which engages a pinion (13) of the registering device (11) supported on one of the bifurcated members (7).

In operation of the device, the framework (1) is attached by suitable means to the ground or else to a convenient part of the framework of the well, and the frames are swung so that the cable or sand-line (R) is positioned between the rollers (9) and (10), as shown in Fig. 1. The preferred angular relationship between the frames (2) and (3) and the ground is approximately as shown in Fig. 2, under which conditions the wheels (7) continue in contact with the cable, as the cable is drawn downwardly. As a further means of maintaining the frame members toward each other and the contact of the wheels (9) and (10) with the cable when in operation the resilient member or spring (14) is provided which also serves to draw the frames toward each other.

As the sand-line or cable is moved, its contact with the registering wheel causes the latter to revolve and thus operates the register (11) which may be adjusted to read directly the length of cable contacting the recording wheel.

In measuring depths of wells, a suitable means is provided to indicate to the operator when the rope reaches the bottom of the well.

In the construction shown in Fig. 3 I have provided an additional carriage mechanism for steadying the sand-line (R) after it has passed the recording wheel (10). This steadying mechanism comprises a pair of rollers (15) and (16), similar in construction to the rollers (9) and (10), and supported by the carriages (17) and (18), respectively. The carriages (17) and (18) are mounted similarly to the carriages (2)

and (3), and when swung into operative position the wide flat wheels (15) and (16) will bear against the sand-line (R) thus steadying same. The bifurcated members of each of the carriages (15) and (16) are provided with openings to receive a pin or bolt (19) whereby the swinging members may be locked and the wheels (16) and (17) thus protected against lateral displacement.

In the construction shown in Fig. 4, in addition to the lower carriage mechanism and wheels (15) and (16), I have provided another carriage mechanism comprising the swinging bifurcated members (20) and (21) which support the rollers (22) and (23), respectively. These rollers are similar to the rollers (15) and (16), and when the carriage is brought into operative position will bear against the sand-line (R) above the registering wheel (10) and thus serve to bring the sand-line in proper alignment preliminary to its engagement with the registering wheel (10). The locking pin (24) serves to lock the members (20) and (21) and prevent lateral displacement of the wheels (22) and (23).

The base (1) is preferably made of heavy metal and is placed on the wooden floorwork around the well. The apparatus functions best when the base (1) is properly levelled, and in the construction shown in Fig. 4 I have provided a means for levelling this base member (1). This comprises the threaded pin (25) passing loosely through the base (1) and having the end (26) tapered and threaded. This pin is screwed into the wooden floorwork (27) by turning the head (28) of the pin. The frame (1) is then raised to the desired height and the threaded washer (29) is then turned upon the threaded member (25) until the washer bears against the bottom of the base (1). By screwing the threaded washer (30) against the top of the base (1), the base is prevented from vertical displacement relative to the pin (25). This pin construction is provided at each corner of the base (1) and affords a convenient means for bringing about the proper levelling.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In an apparatus for measuring depths of wells, a support, a pair of frames, hinges connecting said frames to said support, said frames being constrained to substantially vertical-plane movement, a flat-faced wheel on each frame at substantially the same distance from the hinges connecting the respective frames to the support, said frames being adapted to swing toward each other and grip a cable between the flat faces of said wheels, and registering means upon one of said wheels.

2. In an apparatus for measuring depths of wells, a supporting base, a pair of frames, hinges connecting said frames to said support, said frames being constrained to substantially vertical-plane movement, a wide, flat and hard-faced registering wheel on one of said frames and another flat-faced wheel on the other frame, said wheels being at substantially the same distance from the hinges connecting the respective frames to the supporting base, and said frames being adapted to swing toward each other and grip a cable between the flat faces of said wheels.

3. In an apparatus for measuring depths of wells, a support, a pair of frames, hinges connecting said frames to said support, said frames being constrained to substantially vertical-plane movement, a wide, flat and hard-faced registering wheel on each frame at substantially the same distance from the hinges connecting the respective frames to the support, said frames being adapted to swing toward each other and grip a cable between the flat faces of said wheels, and resilient means for drawing said wheels toward each other.

4. In an apparatus for measuring depths of wells, a support, a pair of frames, hinges connecting said frames to said support, said frames being constrained to substantially vertical-plane movement, each of said frames comprising a pair of bifurcated members, a flat-faced wheel on each frame supported by and between the bifurcated members and at substantially the same distance from the hinges connecting the respective frames to the support, said frames being adapted to swing toward each other and grip a cable between the flat faces of said wheels, and registering means upon one of said wheels.

5. In an apparatus for measuring depths of wells, a support, a plurality of pairs of frames, hinges connecting said frames to said support, said frames being constrained to substantially vertical-plane movement, a flat-faced wheel on each frame, the frames of each pair being adapted to swing toward each other and grip a cable between the flat faces of the wheels upon said frames, and registering means upon one of said wheels.

6. In an apparatus for measuring depths of wells, a support, a plurality of pairs of frames, hinges connecting said frames to said support, said frames being constrained to substantially vertical-plane movement, a wide, flat and hard-faced registering wheel on one of said frames and flat-faced wheels on the other frames, the wheels on each pair of frames being at substantially the same distance from the hinges connecting the respective frames to the supporting base, and said frames being adapted to swing toward each other and grip a cable between the flat faces of the wheels upon said frames.

7. In an apparatus for measuring depths of wells, a support, means for levelling said support, a pair of frames, hinges connecting said frames to said support, said frames being constrained to substantially vertical-plane movement, a flat-faced wheel on each frame at substantially the same distance from the hinges connecting the respective frames to the support, said frames being adapted to swing toward each other and grip a cable between the flat faces of said wheels, and registering means upon one of said wheels.

In testimony whereof I affix my signature.

CHARLES E. VAN ORSTRAND.